United States Patent
Blossom et al.

(10) Patent No.: US 7,937,696 B2
(45) Date of Patent: May 3, 2011

(54) METHOD, SYSTEM AND PROGRAM PRODUCT FOR ADAPTING SOFTWARE APPLICATIONS FOR CLIENT DEVICES

(75) Inventors: Kent L. Blossom, Wilmington, NC (US); Louis C. Foss, Frederick, MD (US); Nuno D. Pereira, Derwood, MD (US); Tapas K. Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 11/014,428

(22) Filed: Dec. 16, 2004

(65) Prior Publication Data

US 2006/0136893 A1  Jun. 22, 2006

(51) Int. Cl.
*G06F 9/44* (2006.01)
*G06F 9/445* (2006.01)

(52) U.S. Cl. ......... 717/168; 717/171; 717/174; 717/176

(58) Field of Classification Search .................. 717/168, 717/171, 174, 176
See application file for complete search history.

(56) References Cited

U.S. PATENT DOCUMENTS

| | | | | |
|---|---|---|---|---|
| 6,078,322 A | * | 6/2000 | Simonoff et al. | 715/744 |
| 6,105,089 A | * | 8/2000 | Chari et al. | 710/302 |
| 6,167,441 A | | 12/2000 | Himmel | |
| 6,167,567 A | * | 12/2000 | Chiles et al. | 717/173 |
| 6,279,030 B1 | | 8/2001 | Britton et al. | |
| 6,701,521 B1 | * | 3/2004 | McLlroy et al. | 717/173 |
| 7,092,987 B2 | * | 8/2006 | Brittingham et al. | 709/203 |
| 2002/0032754 A1 | | 3/2002 | Logston et al. | |
| 2002/0077823 A1 | * | 6/2002 | Fox et al. | 704/260 |
| 2002/0112081 A1 | * | 8/2002 | Armstrong et al. | 709/246 |
| 2003/0182467 A1 | | 9/2003 | Jensen et al. | |
| 2005/0149501 A1 | * | 7/2005 | Barrett | 707/3 |

FOREIGN PATENT DOCUMENTS

WO  WO 03/102778 A2  12/2003

OTHER PUBLICATIONS

Grundy et al., "Building Multi-device, Component-based, Thin-client Groupware: Issues and Experiences", 2001, pp. 71-80.
Litiu et al., "Developing Adaptive Groupware Applications Using a Mobile Component Framework", 2000, pp. 107-116.
Narain et al., "Middleware for Building Adaptive Systems Via Configuration", 2001, pp. 188-195.
Narain et al., INSPEC, AN 7073684, "Middleware for Building Adaptive Systems Via Configuration", 2001.

* cited by examiner

*Primary Examiner* — Philip Wang
(74) *Attorney, Agent, or Firm* — Anna L. Linne; Hoffman Warnick LLC

(57) ABSTRACT

Under the present invention, when a request is received from a client device for a particular software application, the client device will first be interrogated to determine the device platform. Thereafter, the client device will be probed (e.g., from a remote bundle repository) to determine to determine its capabilities. Then, certain components of the requested application can be identified and configured to best take advantage of the client device's capabilities.

27 Claims, 2 Drawing Sheets

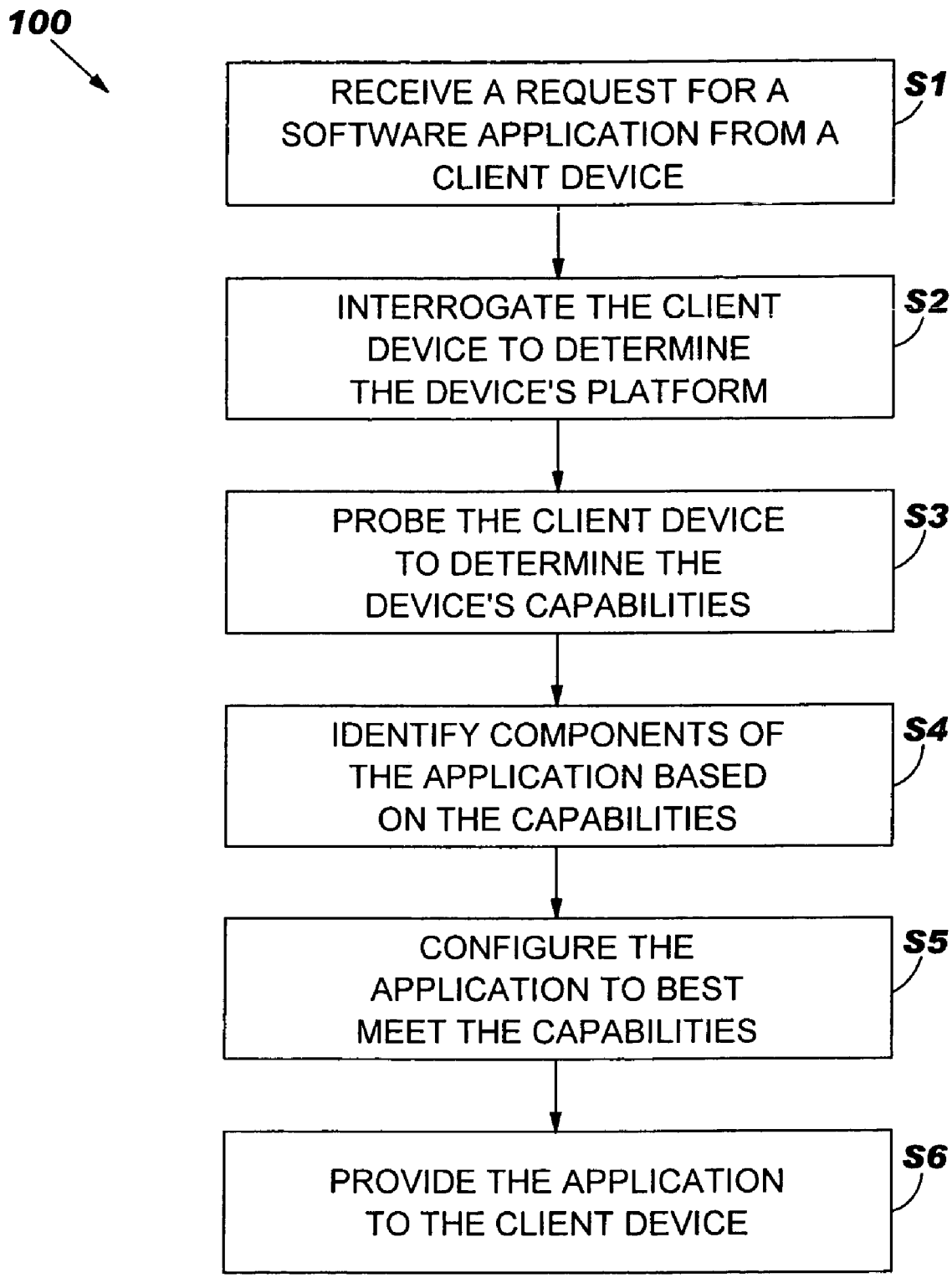

METHOD, SYSTEM AND PROGRAM PRODUCT FOR ADAPTING SOFTWARE APPLICATIONS FOR CLIENT DEVICES

BACKGROUND OF THE INVENTION

1. Field of the Invention

The present invention generally relates to an adaptive software framework. Specifically, the present invention relates to a method, system and program product for adapting software applications to meet the varying capabilities of pervasive devices.

2. Related Art

Recent improvements in pervasive devices and "third generation" wireless bandwidth offerings are leading to a wide variety of advanced applications on cellular telephones, personal digital assistants, and similarly pervasive client devices. However, to optimize the capabilities of such applications in an environment of widely diverse devices, it is important for applications to provide the same "logical functionality" irrespective of the device type, and vary how the functionality appears to the end user according to the features available on his or her device. Specifically, such applications should be capable of adapting (e.g., on-demand and at runtime) to the capabilities of many end-user devices.

For example, consider a simple application that must support the following logical functionality:

(1) Take a message from the user.
(2) Add a greeting line with parameters such as location, initiator characteristics (e.g., a quotation, a photograph, a musical tune, etc.).
(3) Send the message to a predefined list of friends.

Suppose it is desired to support this same logical functionality on two different device types A and B as described below:

Device A: supports pure text messaging and has no notion of location.

Device B: supports audio and location information such as GPS.

What is needed is a single application that when deployed on Device A will accept only a typed message for the greeting line, and when deployed on Device B will create an audio greeting and automatically add a prefix "this is Device B from Austin, Tex."

The scenarios below illustrate additional scenarios where similar issues are encountered:

Scenario 1: Authentication

| Device Capability | User Experience |
|---|---|
| Minimum | User must enter a user name and password |
| Smart Card Reader | User must enter a private PIN upon inserting card |
| Biometric Reader | User interacts with the device's biometric reader and is authenticated |

Scenario 2: Real-time communication

| Device Capability | User Experience |
|---|---|
| Low bandwidth data connection | User must type messages to send and must read them upon receipt. |
| Low bandwidth data, embedded cell phone | User must select the party to be called from a directory, and use the cell phone for real-time voice communication. |
| Low bandwidth, high processing power | User may speak into the device, the speech is recognized and is sent to the called party, and vice-versa. |
| High bandwidth, high processing power | User may use voice over IP to participate in real-time voice communications |

To address the scenarios such as those illustrated above, two traditional solutions have been provided. The first is a lowest common denominator approach whereby software (e.g., JAVA Midlets, JAVA is a trademark of Sun Microsystems Corp. in the United States and/or elsewhere) is developed for a lowest common denominator device (i.e., the least sophisticated or capable device). Although such an approach is fairly easy to code and maintain, it does not take advantage of sophisticated device capabilities and must conform to the lowest common denominator devices such as cellular telephones. Another approach involves developing different version of software for different devices/capabilities. Although this allows different device capabilities to be taken advantage of, it is expensive and difficult to maintain and support.

In view of the foregoing, there exists a need for an adaptive software framework for pervasive devices. Specifically, a need exists for a system that allows a software application to be adapted and configured for the varying capabilities of different pervasive devices.

SUMMARY OF THE INVENTION

In general, the present invention provides an adaptive software framework for pervasive devices. Specifically, the present invention provides a method, system and program product for adapting software applications for client devices. Under the present invention, when a request is received from a client device for a particular software application, the client device will first be interrogated to determine the device platform. Thereafter, the client device will be probed (e.g., from a remote bundle repository) to determine its capabilities. Then, certain components of the requested application can be identified and configured to best take advantage of the client device's capabilities.

A first aspect of the present invention provides a method for adapting software applications for client devices, comprising: receiving a request for a software application from a client device; probing the client device to determine capabilities of the client device; identifying components of the software application based on the capabilities of the client device; and providing the software application having the identified components to the client device.

A second aspect of the present invention provides a method for adapting software applications for client devices, comprising: providing a server connected over a network to a plurality of client devices; receiving a request for a software application from one of the plurality of client devices; probing the one client device to determine its capabilities; identifying components of the software application based on the capabilities of the one client device, wherein only those components of the software application that the one client device is capable of exploiting will be identified; providing the software application having the identified components to the one client device; and configuring the software application according to the capabilities of the one client device.

A third aspect of the present invention provides a system for adapting software applications for client devices, comprising: a system for receiving a request for a software application from a client device; a system for probing the client device to determine capabilities of the client device; a system for identifying components of the software application based on the capabilities of the client device; and a system for providing the software application having the identified components to the client device.

A fourth aspect of the present invention provides a program product stored on a recordable medium for adapting software applications for client devices, which when executed, comprises: a program code for receiving a request for a software application from a client device; a program code for probing the client device to determine capabilities of the client device; a program code for identifying components of the software application based on the capabilities of the client device; and a program code for providing the software application having the identified components to the client device.

A fifth aspect of the present invention provides a method for deploying an application for adapting software applications for client devices, comprising: providing a computer infrastructure being operable to: receive a request for a software application from a client device; probe the client device to determine capabilities of the client device; identify components of the software application based on the capabilities of the client device; and provide the software application having the identified components to the client device.

A sixth aspect of the present invention provides computer software embodied in a propagated signal for adapting software applications for client devices, the computer software comprising instructions to cause a computer system to perform the following functions: receive a request for a software application from a client device; probe the client device to determine capabilities of the client device; identify components of the software application based on the capabilities of the client device; and provide the software application having the identified components to the client device.

Therefore, the present invention provides a method, system and program product for adapting software applications for client devices.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a method flow diagram according to the present invention.

Figure 1:
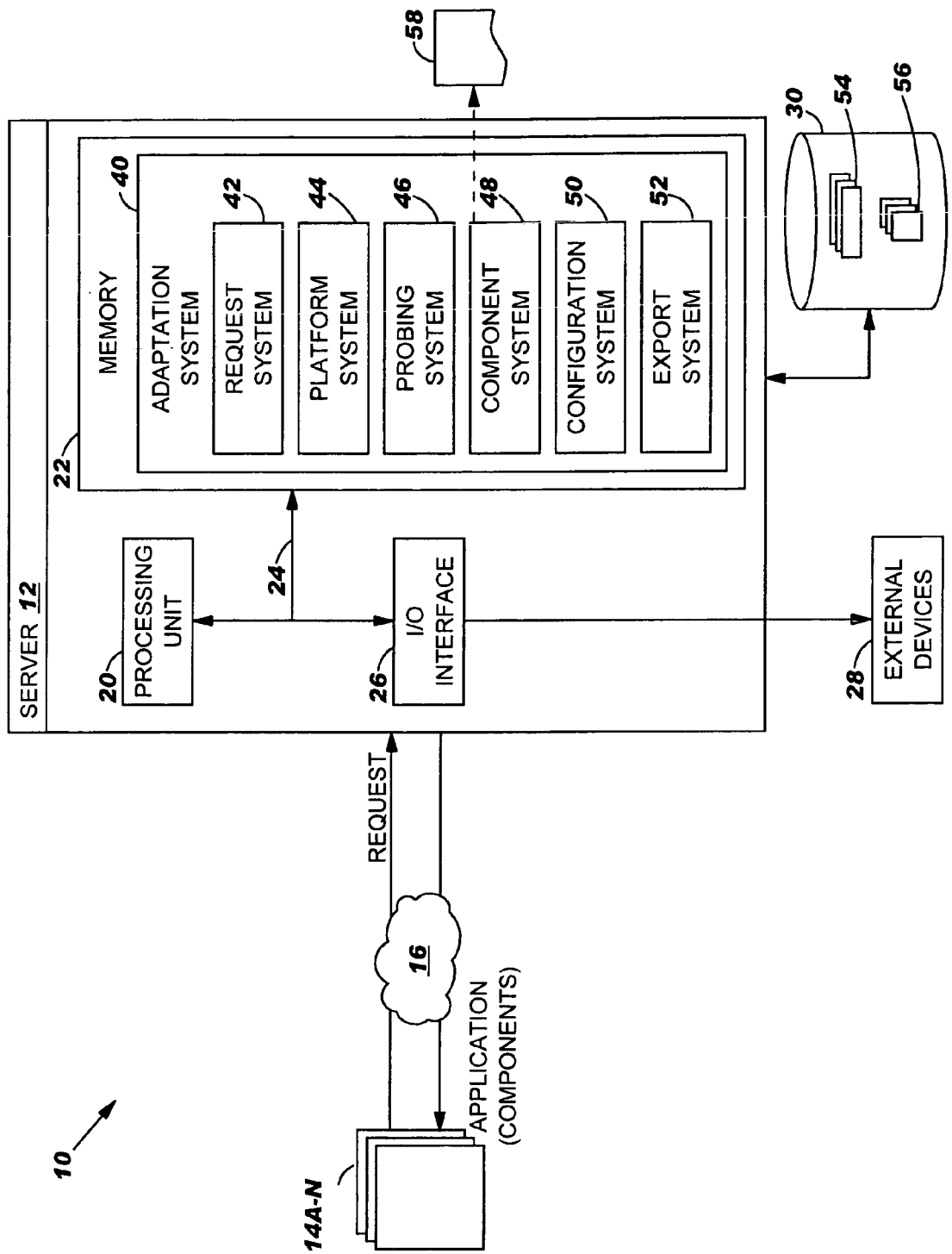
FIG. 1 depicts a system/framework for adapting software applications for client devices according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides an adaptive software framework for pervasive devices. Specifically, the present invention provides a method, system and program product for adapting software applications for client devices. Under the present invention, when a request is received from a client device for a particular software application, the client device will first be interrogated to determine the device platform. Thereafter, the client device will be probed (e.g., from a remote bundle repository) to determine to determine its capabilities. Then, certain components of the requested application can be identified and configured to best take advantage of the client device's capabilities.

Referring now to FIG. 1, a system/framework (hereinafter system 10) for adapting software applications for client devices 14A-N is shown. It should be appreciated that in an illustrative embodiment, client devices 14A-N represents pervasive devices such as cellular telephones, personal digital assistants, pager devices, etc. However, the teachings recited herein could be utilized with any type of computerized or client device. In any event, client devices 14A-N communicate with server 12 over a network 16 such as the Internet, a local area network (LAN), a wide area network (WAN), a virtual private network (VPN), etc. Communication throughout the network 16 could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As shown, server 12 includes processing unit 20, memory 22, bus 24, input/output (I/O) interfaces 26, external devices/resources 28 and repository 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to processing unit 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in server 12 and likewise may comprise any known type of transmission link, including electrical, optical, wireless, etc.

Repository 30 can be any system (e.g., a database, etc.) capable of providing storage for information under the present invention. Such information could include, bundles 54 for probing client devices 14A-N, application components 56, etc. As such, repository 30 could include one or more storage devices, such as a magnetic disk drive or an optical disk drive. In another embodiment, repository 30 includes data distributed across, for example, a local area network (LAN), wide area network (WAN) or a storage area network (SAN) (not shown). Although not shown, additional components, such as cache memory, communication systems, system software, etc., may be incorporated into server 12.

Shown in memory 22 of server 12 as a program product is adaptation system 40. Under the present invention, when a particular software application (hereinafter application) is desired for a client device, a request for the application will be communicated to server 12. Under previous implementations, either multiple versions of the software application would be available to accommodate the different types of client devices 14A-N, or a single version would be available that was tailored towards the lowest common denominator client device. As mentioned above, neither implementation is preferable.

In an illustrative example, assume that a user of client device 14A is requesting a particular application from server 12. Under the present invention, when the request for the application is issued from client device 14A, it will be received by request system 42 of adaptation system 40. Upon receipt, platform system 44 will interrogate client device 14A to determine the device's platform (e.g., operating system and hardware properties). Once this has been determined, probing system 46 will coordinate the probing of client device 14A to determine its capabilities. In a typical embodiment, the probing is implemented using bundles 54 from (remote) repository 30. To this extent, the present invention can utilize the native bundle services of the Service Management Framework (SMF), and optionally, the native user interface capabilities of the Standard Widget Toolkit (SWT). Software applications that conform to this framework are capable of running on any client device 14A-N that supports the JAVA programming language, and can run SWT which is capable of adapting its user experience.

Regardless, once the probing is complete, Meta data or the like describing the capabilities of the client device 14A will be passed to component system 48. Based on those capabilities, component system 48 will identify/select one or more components 56 of the requested application that meet the capabilities of client device 14A. That is, only those components that client device 14A is capable of implementing/exploiting will be identified by component system 48. The identified components can be added to a list, table or the like 58 as maintained by component system 48. For example, a separate list 58 could be maintained each time an application is requested.

In this illustrative example, assume that client device 14A is a personal digital assistant having biometric reading capabilities (e.g., a biometric reader), but not Global Positioning Satellite (GPS) capabilities. In such a case, the components 56 of the requested application that utilize biometric readings will be identified, while those that utilize GPS technology will not be identified by component system 48. It should be understood that in identifying components 56 to meet the capabilities of client device 14A, component system 48 can identify components utilizing "lesser" as well as "greater" capabilities of client device 14. For example, assume that for authentication scenarios, a user of client device 14A could be authenticated using a biometric reading, or by manually inputting text-based authentication information. That is, assume client device 14A is capable of handling biometric readings as well as plain text. In such a case, components 56 of the application for both capabilities would be identified.

Once all pertinent components of the application have been identified, configuration system 50 will "aggregate" and configure the components into the requested application to best meet the capabilities of client device 14A. For example, if client device 14A is capable of handling biometric readings as well as plain text for authentication purposes, configuration system 50 could configure the application so that the biometric reading function (e.g., the "greater" or "higher level" function) is the default method for authentication. In such a case, the user would only be prompted to authenticate his/herself via the text-based method in the event of failure of the biometric function (e.g., damage to the biometric reader), in the event of a manual override by the user, or in the event of some other overriding circumstance. To this extent, configuration system 50 can configure the application to meet the "highest" common denominator capability of the requesting client device 14A. This can be accomplished by prioritizing the components 56 set forth in the list 58. Once the application has been configured, export system 52 can communicate the application to client device 14A.

Referring now to FIG. 2, a method flow diagram 100 according to the present invention is depicted. As shown, first step S1 is to receive a request for a software application from a client device. Second step S2 is to interrogate the client device to determine the device's platform. Third step S3 is to probe the client device to determine its capabilities. Fourth step S4 is to identify components of the requested application based on the capabilities. Fifth step S5 is to configure the application to best meet the capabilities of the client device. Sixth step S6 is to provide the application to the client device.

It should be appreciated that the present invention could be offered as a business method on a subscription or fee basis. For example, server 12 and/or adaptation system 40 could be created, supported, maintained and/or deployed by a service provider that offers the functions described herein for customers. That is, a service provider could offer to adapt software applications for requesting users/client devices.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following:(a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for adapting software applications for client devices, comprising:

receiving at a server a request for a software application from a first client device and a second request for the software application from a second client device;

probing from the server the first client device to determine capabilities of the first client device in response to receipt of the request and the second client device to determine capabilities of the second client device in response to receipt of the second request;

identifying a first set of components of the software application based on the capabilities of the first client device and a second set of components of the software application based on the capabilities of the second client device determined by the probing, every one of the components in the first set of components and the second set of components being independent modules configured to provide a single capability for performing a logical function when used by a base module of the software application, wherein the identifying identifies only components of the software application that the first client device and the second client device are capable of implementing and identifies all components that the first client device and the second client device are capable of implementing;

automatically configuring the base module for operation on the first client device and automatically configuring the base module for operation on the second client device with all of the identified components based on the capabilities determined via the probing so as to take advantage of a highest common denominator capability of the first client device by prioritizing the first set of components and so as to take advantage of a highest common denominator capability of the second client device by prioritizing the second set of components; and providing the configured software application having the identified components to the first client device and the second client device, wherein use of different combinations of the identified components for different devices allows an identical version of the base module to perform a logical function using sophisticated device capabilities on the first client device having the sophisticated device capabilities and to perform the logical function using less sophisticated device capabilities on the second client device that does not have the sophisticated device capabilities.

2. The method of claim 1, wherein the identifying step comprises selecting only those components of the software application that the client device is capable of exploiting.

3. The method of claim 1, wherein the identifying step comprises forming a list of components that the client device is capable of exploiting.

4. The method of claim 1, further comprising determining a platform of the client device, prior to the identifying step.

5. The method of claim 4, wherein the step of determining a platform of the client device comprises determining hardware and operating system properties of the client device.

6. The method of claim 1, wherein the request is received on a server that is connected over a network to a plurality of client devices.

7. The method of claim 1, wherein the probing step comprises probing the client device using bundles from a remote repository.

8. The method of claim 1, wherein the client device comprises a pervasive device.

9. A method for adapting software applications for client devices, comprising:

providing a server connected over a network to a plurality of client devices;

receiving at the server a request for a software application from one of the plurality of client devices;

probing from the server, based on receipt of the request, the one client device to determine its capabilities;

identifying components of the software application based on the capabilities of the one client device determined by the probing, wherein only those components of the software application that the one client device is capable of exploiting will be identified and all components of the software application that the one client device is capable of exploiting will be identified;

providing the configured software application having the identified components to the one client device so as to take advantage of a highest common denominator capability of the client device by prioritizing the identified components; and automatically configuring the software application with all of the identified components according to the capabilities of the one client device determined via the probing, all of the plurality of client devices running an identical version of the same preconfigured software application.

10. A system for adapting software applications for client devices, comprising:

a computer server device having:

a system for receiving a request for a software application from a client device;

a system for probing, based on receipt of the request, the client device to determine capabilities of the client device;

a system for identifying components of the software application based on the capabilities of the client device determined by the probing, wherein the identifying identifies only components of the software application that the client device is capable of implementing and identifies all components that the client device is capable of implementing; and a system for automatically configuring the application for operation on the client device with all of the identified components based on the capabilities determined via the probing so as to take advantage of a highest common denominator capability of the client device by prioritizing the identified components; and a system for providing the configured software application having the identified components to the client device, wherein use of different combinations of the identified components for different devices allows an identical version of a base module of the software application to perform a logical function using sophisticated device capabilities on a first device having the sophisticated device capabilities and to perform the logical function using less sophisticated device capabilities on a second device that does not have the sophisticated device capabilities.

11. The system of claim 10, wherein the system for identifying is operable to select only those components of the software application that the client device is capable of exploiting.

12. The system of claim 10, wherein the system for identifying further forms a list of components that the client device is capable of exploiting.

13. The system of claim 10, further comprising a system for determining a platform of the client device, prior to the identifying step.

14. The system of claim 13, wherein the system for determining a platform of the client device is operable to determine hardware and operating system properties of the client device.

15. The system of claim 10, wherein the request is received on a server that is connected over a network to a plurality of client devices.

16. The system of claim 10, wherein the system for probing utilizes bundles from a repository.

17. The system of claim 10, wherein the client device comprises a pervasive device.

18. A program product stored on a recordable medium for adapting software applications for client devices, which when executed, comprises:

a program code for receiving at a server a request for a software application from a client device;

a program code for probing, based on receipt of the request, from the server the client device to determine capabilities of the client device;

a program code for identifying components of the software application based on the capabilities of the client device determined by the probing, wherein the identifying identifies only components of the software application that the client device is capable of implementing and identifies all components that the client device is capable of implementing;

a program code for automatically configuring the application for operation on the client device with all of the identified components based on the capabilities determined via the probing so as to take advantage of a highest common denominator capability of the client device by prioritizing the identified components; and a program code for providing the configured software application having the identified components to the client device, wherein use of different combinations of the identified components for different devices allows an identical version of a base module of the software application to perform a logical function using sophisticated device capabilities on a first device having the sophisticated device capabilities and to perform the logical function using less sophisticated device capabilities on a second device that does not have the sophisticated device capabilities.

19. The program product of claim 18, wherein the program code for identifying is operable to select only those components of the software application that the client device is capable of exploiting.

20. The program product of claim 18, wherein the program code for identifying further forms a list of components that the client device is capable of exploiting.

21. The program product of claim 18, further comprising a program code for determining a platform of the client device, prior to the identifying step.

22. The program product of claim 21, wherein the program code for determining a platform of the client device is operable to determine hardware and operating system properties of the client device.

23. The program product of claim 18, wherein the request is received on a server that is connected over a network to a plurality of client devices.

24. The program product of claim 18, wherein the program code for probing utilizes bundles from a repository.

25. The program product of claim 18, wherein the client device comprises a pervasive device.

26. A method for deploying an application for adapting software applications for client devices, comprising:
providing a computer infrastructure being operable to:
receive at a server a request for a software application from a client device;

probe from the server, based on receipt of the request, the client device to determine capabilities of the client device;

identify components of the software application based on the capabilities of the client device determined by the probing, wherein the identifying identifies only components of the software application that the client device is capable of implementing and identifies all components that the client device is capable of implementing;

automatically configure the application for operation on the client device with all of the identified components based on the capabilities determined via the probing so as to take advantage of a highest common denominator capability of the client device by prioritizing the identified components; and provide the configured software application having the identified components to the client device, wherein use of different combinations of the identified components for different devices allows an identical version of a base module of the software application to perform a logical function using sophisticated device capabilities on a first device having the sophisticated device capabilities and to perform the logical function using less sophisticated device capabilities on a second device that does not have the sophisticated device capabilities.

27. Computer software embodied in a computer device for adapting software applications for client devices, the computer software comprising instructions to cause a computer system to perform the following functions:

receive a request for a software application from a client device;

probe from the server, based on receipt of the request, the client device to determine capabilities of the client device;

identify components of the software application based on the capabilities of the client device determined by the probing, wherein the identifying identifies only components of the software application that the client device is capable of implementing and identifies all components that the client device is capable of implementing;

automatically configure the application for operation on the client device with all of the identified components based on the capabilities determined via the probing so as to take advantage of a highest common denominator capability of the client device by prioritizing the identified components; and provide the configured software application having the identified components to the client device, wherein use of different combinations of the identified components for different devices allows an identical version of a base module of the software application to perform a logical function using sophisticated device capabilities on a first device having the sophisticated device capabilities and to perform the logical function using less sophisticated device capabilities on a second device that does not have the sophisticated device capabilities.

* * * * *